UNITED STATES PATENT OFFICE.

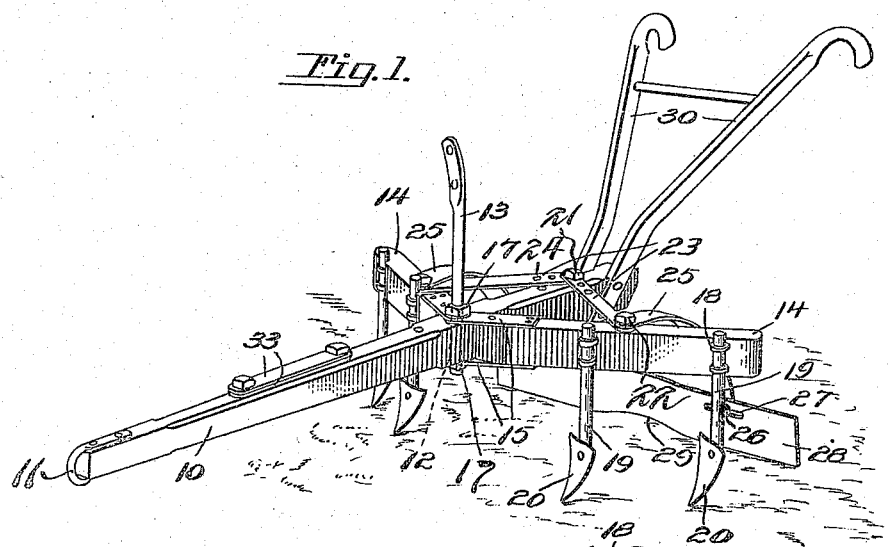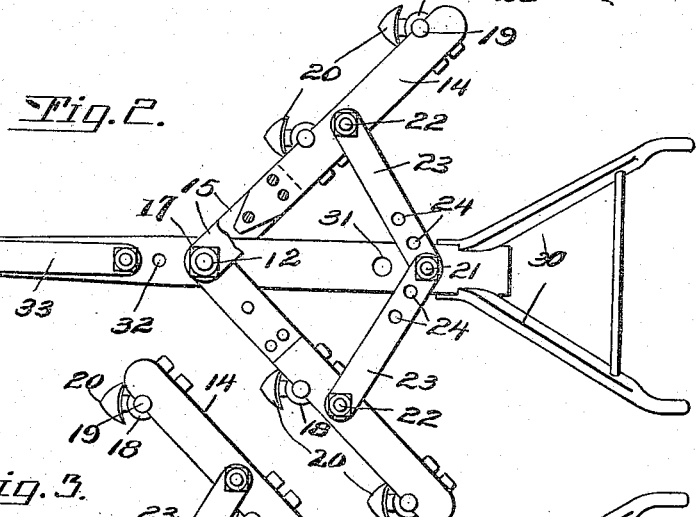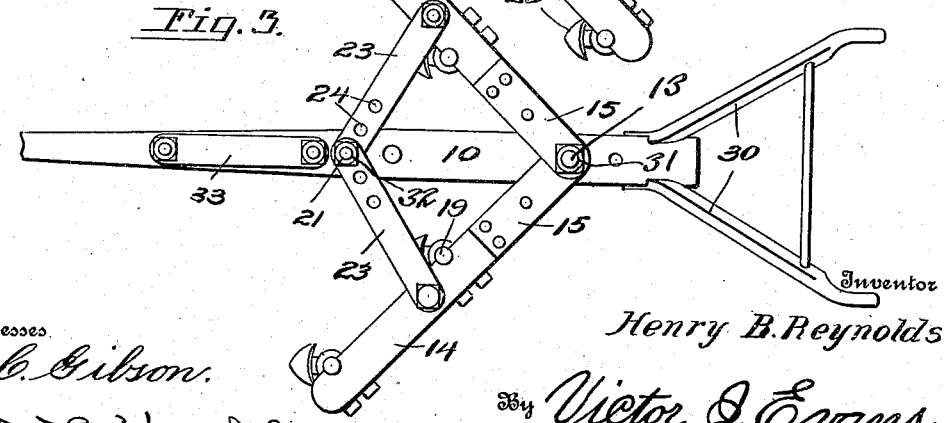

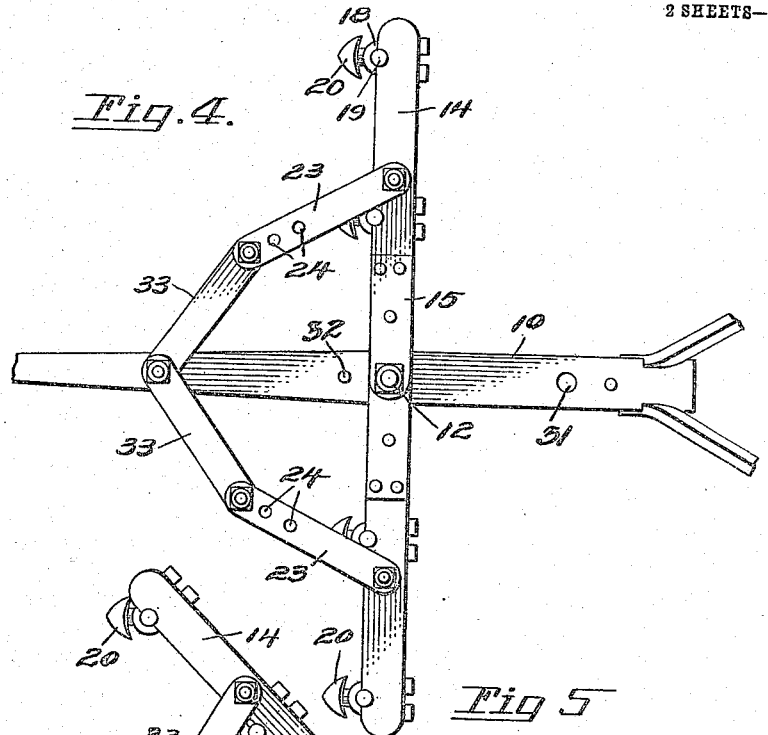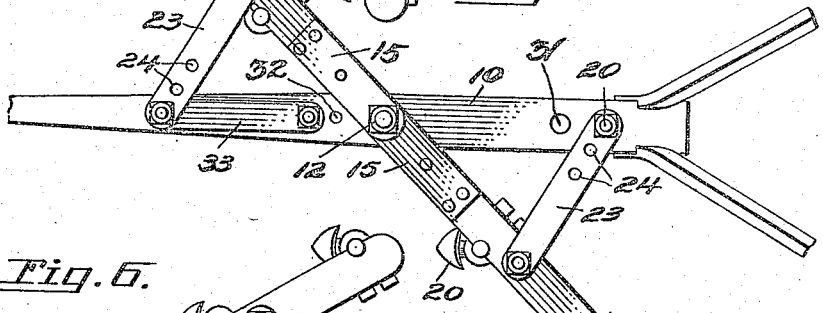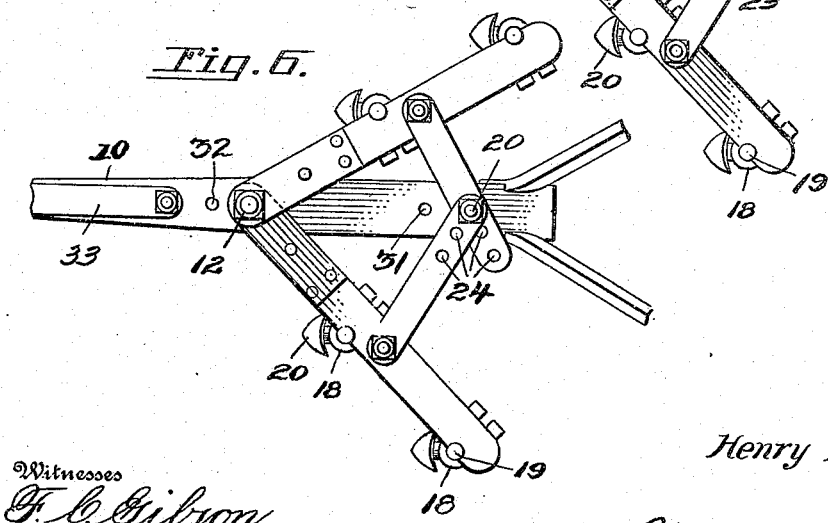

HENRY B. REYNOLDS, OF PETAL, MISSISSIPPI, ASSIGNOR OF ONE-FOURTH TO G. D. McINNIS, ONE-FOURTH TO W. M. REYNOLDS, AND ONE-FOURTH TO J. C. BALLARD, OF HATTIESBURG, MISSISSIPPI, AND ONE-EIGHTH TO W. H. WHITTLE, OF COLLINS, MISSISSIPPI.

CULTIVATOR.

936,943.  Specification of Letters Patent.  Patented Oct. 12, 1909.

Application filed July 21, 1908. Serial No. 444,586.

*To all whom it may concern:*

Be it known that I, HENRY B. REYNOLDS, a citizen of the United States of America, residing at Petal, in the county of Forrest and State of Mississippi, have invented new and useful Improvements in Cultivators, of which the following is a specification.

This invention relates to agricultural implements and more particularly to a combined implement capable of being readily converted into a corn coverer, a harrow, a middle or ridge burster or a rake, and has for an object to provide an implement of this character which may be manufactured at a relatively low figure, and which will be strong and durable in construction.

With these and other ends, which will readily appear as the nature of the invention is better understood, the same consists in the improved construction and novel arrangement of parts which will be hereinafter fully described, and particularly pointed out in the claim.

The invention is clearly illustrated in the accompanying drawings, in which:—

Figure 1 is a perspective view of the present invention showing the same in use as a corn coverer. Fig. 2 is a top plan view, partly in section, showing the implement converted into a V-harrow. Fig. 3 is a top plan view of the implement in use as a ridge burster. Fig. 4 is a top plan view of the implement in use as a rake. Fig. 5 is a top plan view of the implement in use as a side harrow. Fig. 6 is a top plan view of a hill plow.

Referring now more particularly to the drawing there is shown in Fig. 1 of the drawing the implement in use as a corn coverer, comprising a longitudinally disposed draft beam or pole 10, provided at its forward end with a clevis 11 of any suitable form. Located adjacent to the rear end of the beam or pole 10, and formed therein, is shown a vertical passage 12 which receives in this form of my invention one end of a shovel shank 13, the same serving as a pivot for a pair of wings 14. Each wing 14, at its inner end, is substantially V shape in plan, to facilitate its movement toward the beam 10 as will be readily understood. Each wing is provided at its inner end with a pair of spaced plates 15 through which is also passed the shank 13. The shank is preferably secured in place by means of clamping nuts 17 but it is obvious that any suitable fastening means may be employed. Each wing is provided with a plurality of clips 18 for receiving the shanks 19, to which are connected at their lower ends shovels 20. Rearwardly of the passage 12, the beam is provided with a bolt 21, and midway between the ends, the wings 14 are provided with similar bolts 22, the latter bolts receiving the outer ends of links 23 having at their inner ends a plurality of adjusting passages 24 arranged to aline with each other, and which are thus adapted for engagement with the bolt 21. It will thus be seen that the wings 14 are effectively held at the desired angle with respect to the beam or pole 10. The bolts 22 also receive the upper ends of arcuate members 25; the lower ends of which extend rearwardly of the wings 14, and are provided with clamping bolts 26 disposed in longitudinal slots 27 formed in a transversely extending covering blade 28. The blade is preferably formed of flat steel or the like and upon its under edge, this blade is provided with a concaved or arcuate portion 29. The construction of the members 25 which are formed of elastic material, such as spring steel or the like is such that the blade 28 is yieldingly mounted to facilitate its travel over obstructions on a field. It may be stated that the beam 10 carried at the rear end thereof a pair of handles 30 of usual form.

As shown in Fig. 2 of the drawings, the implement is in the form of a cultivator, the difference in this form of my invention being in the omission of the blade, 28.

In the form shown in Fig. 3 the wings 14 are moved rearwardly on the beam 10 and the shank 13 is disposed in a passage 31. The bolt 21 is removed from its place shown in Figs. 1 and 2 of the drawings and is disposed in a passage 32, as shown, and the links 23 have their ends which are provided with the openings 24 engaged with said bolt, and the other ends of these links are engaged with said wings. This form of my invention forms what may be termed a middle or ridge burster. Midway between the ends of the beam, there is shown a pair of links 33 which are ordinarily fixed at their ends to said beam.

As shown in Fig. 4 of the drawings, the wings 14 are moved or swung at right angles to said beam, the links 33, being unfastened from said beam at their rear ends, and these ends are connected to the links 23, as shown to effectively hold the wings in the position shown to form a rake, as is obvious.

In Fig. 5, the wings 14 are brought into alinement with each other and each wing is held in this position by means of the links 23 previously referred to and which, as shown in this figure, are connected to the wings and to the beam respectively. This form of my invention effectively serves as a side harrow as will be understood.

In Fig. 6 of the drawings the invention is in the form of a hill plow, one of the wings being swung at a greater angle with respect to the beam than the other wing, and these wings are held in this position by means of the links 23, one of which having its outermost opening 24 in alinement with the innermost opening of the other link and thus receives the bolt 21, as shown.

From the foregoing description it will be seen that a simple and inexpensive device is produced, which is capable of being readily converted into various forms of agricultural implements In all forms of the invention, excepting that shown in Fig 1, the shank 13 serves to form means for supporting a cutting shovel and thus serves a double function, i. e., the just mentioned purpose, and as a means for pivotally mounting the wings to the beam 10.

Having thus fully described the invention, what is claimed as new, is:—

In an agricultural implement, a draft beam having a series of passages formed therein adjacent to one of its ends, said beam having a second series of passages formed therein and located at a point in advance of the first named series of passages, horizontally adjustable shovel-carrying wings at the sides of said beam, means adapted to be engaged in one of either series of passages and with the said wings respectively to provide pivotal movement of the said wings, links carried by said wings, means adapted to be engaged in the other passage of either of said series to hold the wings in their adjusted positions but out of alinement with each other, and beam-carried means adapted to be engaged with said links to hold the wings in alinement with each other.

In testimony whereof I affix my signature in presence of two witnesses .

HENRY B. REYNOLDS.

Witnesses:
H. E. CLARK,
T. JELLIXON.